(12) United States Patent
Lee et al.

(10) Patent No.: US 12,726,816 B2
(45) Date of Patent: Sep. 1, 2026

(54) METHOD AND DEVICE FOR BINDING USER AND UE IN MOBILE COMMUNICATION SYSTEM

(71) Applicant: Samsung Electronics Co., Ltd., Suwon-si (KR)

(72) Inventors: Jicheol Lee, Suwon-si (KR); Erik Guttman, Staines (GB); Hyesung Kim, Suwon-si (KR); Duckey Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 309 days.

(21) Appl. No.: 18/356,067

(22) Filed: Jul. 20, 2023

(65) Prior Publication Data

US 2024/0031806 A1 Jan. 25, 2024

(30) Foreign Application Priority Data

Jul. 22, 2022 (KR) ........................ 10-2022-0091359

(51) Int. Cl.

*H04W 12/06* (2021.01)
*H04W 8/18* (2009.01)
*H04W 12/69* (2021.01)

(52) U.S. Cl.

CPC ............. *H04W 12/06* (2013.01); *H04W 8/18* (2013.01); *H04W 12/69* (2021.01)

(58) Field of Classification Search

CPC ....... H04W 12/06; H04W 8/18; H04W 12/69; H04W 12/72

See application file for complete search history.

(56) References Cited

U.S. PATENT DOCUMENTS 11,196,680 B1 * 12/2021 Caceres .................. H04L 47/70
11,228,907 B2 * 1/2022 Loreskar ............ H04L 63/0823

(Continued)

FOREIGN PATENT DOCUMENTS

EP 4013091 A1 6/2022
JP 2021-092857 A 6/2021

(Continued)

OTHER PUBLICATIONS

International Search Report and Written Opinion of the International Searching Authority dated Oct. 19, 2023, in connection with International Application No. PCT/KR2023/010037, 7 pages.

*Primary Examiner* — Dhaval V Patel

(57) ABSTRACT

Disclosed is a method and device for binding a user and a UE in a mobile communication system. A method by a network entity may comprise receiving provisioning information for a user from a service provider, receiving a binding request message including verification information and a digital user identifier from a user equipment completing user authentication for the service provider, verifying the verification information using the provisioning information, and the verification information being successfully verified, binding the digital user identifier with the UE's subscriber information and storing in a subscriber database. The subscriber database may be used to provide a service corresponding to a service invocation to the UE in response to receiving the service invocation including the digital user identifier from the service provider.

20 Claims, 8 Drawing Sheets

(56) References Cited

U.S. PATENT DOCUMENTS

| | | | | |
|---|---|---|---|---|
| 2011/0171975 | A1* | 7/2011 | Yin | H04W 8/02 455/456.2 |
| 2019/0104134 | A1 | 4/2019 | Lee et al. | |
| 2019/0253407 | A1 | 8/2019 | Livanos et al. | |
| 2021/0037375 | A1* | 2/2021 | Cakulev | H04W 8/186 |
| 2022/0086632 | A1 | 3/2022 | Wang | |
| 2022/0322067 | A1 | 10/2022 | Kim et al. | |
| 2023/0413032 | A1* | 12/2023 | Kumar | H04W 12/08 |

FOREIGN PATENT DOCUMENTS

| | | | |
|---|---|---|---|
| KR | 10-2020-0061348 | A | 6/2020 |
| KR | 10-2022-0138632 | A | 10/2022 |
| WO | 2020247764 | A1 | 12/2020 |
| WO | 2021104630 | A1 | 6/2021 |
| WO | 2021209379 | A1 | 10/2021 |

* cited by examiner

METHOD AND DEVICE FOR BINDING USER AND UE IN MOBILE COMMUNICATION SYSTEM

CROSS-REFERENCE TO RELATED APPLICATION

This application is based on and claims priority under 35 U.S.C. § 119 to Korean Patent Application No. 10-2022-0091359, which was filed in the Korean Intellectual Property Office on Jul. 22, 2022, the entire disclosure of which is incorporated herein by reference.

BACKGROUND

1. Field

The disclosure relates to a wireless communication system and, more specifically, to a method and device for binding a digital user identifier for a service provider with subscriber information about a mobile communication network.

2. Description of Related Art

5$^{th}$ generation (5G) mobile communication technology defines a wide frequency band to enable fast transmission speed and new services and may be implemented in frequencies below 6 GHz ('sub 6GHz'), such as 3.5 GHz, as well as in ultra-high frequency bands ('above 6 GHz'), such as 28 GHz and 39 GHz called millimeter wave (mmWave). Further, 6G mobile communication technology, which is called a beyond 5G system, is considered to be implemented in terahertz bands (e.g., 95 GHz to 3 THz) to achieve a transmission speed 50 times faster than 5G mobile communication technology and ultra-low latency reduced by 1/10.

In the early stage of 5G mobile communication technology, standardization was conducted on beamforming and massive MIMO for mitigating propagation pathloss and increasing propagation distance in ultrahigh frequency bands, support for various numerologies for efficient use of ultrahigh frequency resources (e.g., operation of multiple subcarrier gaps), dynamic operation of slot format, initial access technology for supporting multi-beam transmission and broadband, definition and operation of bandwidth part (BWP), new channel coding, such as low density parity check (LDPC) code for massive data transmission and polar code for high-reliable transmission of control information, L2 pre-processing, and network slicing for providing a dedicated network specified for a specific service, so as to meet performance requirements and support services for enhanced mobile broadband (eMBB), ultra-reliable low-latency communications (URLLC), and massive machine-type communications (mMTC).

Currently, improvement and performance enhancement in the initial 5G mobile communication technology is being discussed considering the services that 5G mobile communication technology has intended to support, and physical layer standardization is underway for technology, such as vehicle-to-everything (V2X) for increasing user convenience and assisting autonomous vehicles in driving decisions based on the position and state information transmitted from the VoNR, new radio unlicensed (NR-U) aiming at the system operation matching various regulatory requirements, NR UE power saving, non-terrestrial network (NTN) which is direct communication between UE and satellite to secure coverage in areas where communications with a terrestrial network is impossible, and positioning technology.

Also being standardized are radio interface architecture/protocols for technology of industrial Internet of things (IIoT) for supporting new services through association and fusion with other industries, integrated access and backhaul (IAB) for providing nodes for extending the network service area by supporting an access link with the radio backhaul link, mobility enhancement including conditional handover and dual active protocol stack (DAPS) handover, 2-step RACH for NR to simplify the random access process, as well as system architecture/service fields for 5G baseline architecture (e.g., service based architecture or service based interface) for combining network functions virtualization (NFV) and software-defined networking (SDN) technology and mobile edge computing (MEC) for receiving services based on the position of the UE.

As 5G mobile communication systems are commercialized, soaring connected devices would be connected to communication networks so that reinforcement of the function and performance of the 5G mobile communication system and integrated operation of connected devices are expected to be needed. To that end, new research is to be conducted on, e.g., extended reality (XR) for efficiently supporting, e.g., augmented reality (AR), virtual reality (VR), and mixed reality (MR), and 5G performance enhancement and complexity reduction using artificial intelligence (AI) and machine learning (ML), support for AI services, support for metaverse services, and drone communications.

Further, development of such 5G mobile communication systems may be a basis for multi-antenna transmission technology, such as new waveform for ensuring coverage in 6G mobile communication terahertz bands, full dimensional MIMO (FD-MIMO), array antenna, and large scale antenna, full duplex technology for enhancing the system network and frequency efficiency of 6G mobile communication technology as well as reconfigurable intelligent surface (RIS), high-dimensional space multiplexing using orbital angular momentum (OAM), metamaterial-based lens and antennas to enhance the coverage of terahertz band signals, AI-based communication technology for realizing system optimization by embedding end-to-end AI supporting function and using satellite and artificial intelligence (AI) from the step of design, and next-generation distributed computing technology for implementing services with complexity beyond the limit of the UE operation capability by way of ultrahigh performance communication and computing resources.

The 3GPP, which is in charge of cellular mobile communication standardization, has named the new core network structure 5G core (5GC) and standardized the same to promote the evolution from the 4G LTE system to the 5G system. 5GC supports the following differentiated functions as compared to the evolved packet core (EPC), which is the network core for 4G.

5GC adopts the network slicing function. As a requirement of 5G, 5GC may support various types of terminals and services, e.g., enhanced mobile broadband (eMBB), ultra reliable low latency communications (URLLC), or massive machine type communications (mMTC). These UEs/services have different requirements for the core network. For example, the eMBB service may require a high data rate while the URLLC service may require high stability and low latency. There has been provided network slicing technology to meet such various requirements.

Network slicing may mean a method for creating several logical networks (e.g., network slices) by virtualizing one physical network. An activated network slice may be referred to as a network slice instance, and each network slice instance (NSI) may have a different characteristic. The mobile communication operator may meet various service requirements according to the UE/service by configuring a network function (NF) fitting the characteristics of each NSI. For example, the mobile communication operator may allocate the NSI fitting the characteristics of the service required for each UE and efficiently support several 5G services (e.g., eMBB, URLLC, or mMTC).

The 5G system may seamlessly support the network virtualization paradigm through separation of the mobility management function and the session management function. In 4G LTE, all UEs may receive services over the network through signaling exchange with a single core entity called the mobility management entity (MME) in charge of registration, authentication, mobility management and session management functions. In the 5G system, the number of UEs (including, e.g., MTC UEs) explosively increases and mobility and traffic/session characteristics that need to be supported according to the type of UE are subdivided. Resultantly, if all functions are supported by a single device, such as MME, the scalability of adding entities for each required function may decrease. Accordingly, various functions are under development based on a structure that separates the mobility management function and the session management function to enhance the scalability in terms of function/implementation complexity of the core entity in charge of the control plane and the signaling load.

SUMMARY

Through embodiments of the disclosure, a service provider may perform authentication on the user who has subscribed to the service provider.

Through embodiments of the disclosure, there may be provided a method and device by which a service provider may identify that a user subscribing to the service provider accessed a service through a user equipment (UE) registered in a mobile communication network through the management network.

According to an embodiment, a method by a network entity for mobile binding may comprise receiving provisioning information for a user from a service provider, receiving a binding request message including verification information and a digital user identifier related to a user equipment completing user authentication for the service provider, verifying the verification information using the provisioning information, and based on the verification information being successfully verified, binding the digital user identifier with the UE's subscriber information and storing in a subscriber database. The subscriber database may be used to provide a service corresponding to a service invocation to the UE in response to receiving the service invocation including the digital user identifier from the service provider.

According to an embodiment, a network entity for mobile binding may comprise a communication circuit and a controller. The controller may be configured to receive provisioning information for a user from a service provider, receive verification information and a digital user identifier from a UE completing user authentication for the service provider, verify the verification information using the provisioning information, and the verification information being successfully verified, bind the digital user identifier with the UE's subscriber information and store in a subscriber database. The subscriber database may be used to provide a service corresponding to a service call to the UE in response to receiving the service call including the digital user identifier from the service provider.

According to an embodiment, a method by a UE for mobile binding may comprise performing digital user authentication with a service provider, receiving provisioning information for a user from the service provider, transmitting a binding request message including a digital user identifier and verification information to a network entity, and receiving, from the network entity, a binding response message including a result of verifying the verification information.

According to an embodiment, a UE for mobile binding may comprise a communication circuit and a controller. The controller may be configured to perform digital user authentication with a service provider, receive provisioning information for a user from the service provider, transmit a binding request message including a digital user identifier and verification information to a network entity, and receive, from the network entity, a binding response message including a result of verifying the verification information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure are described in detail with reference to the accompanying drawings. When determined to make the subject matter of embodiments unclear, the detailed description of the known art or functions may be skipped. The terms as used herein are defined considering the functions in the disclosure and may be replaced with other terms according to the intention or practice of the user or operator. Therefore, the terms should be defined based on the overall disclosure.

Hereinafter, the base station may be an entity allocating resource to terminal and may be at least one of eNodeB, Node B, base station (BS), radio access network (RAN), access network (AN), RAN node, wireless access unit, base station controller, or node over network. The user equipment (UE) may include a mobile station (MS), cellular phone, smartphone, computer, or multimedia system capable of performing communication functions. According to the disclosure, downlink (DL) may refer to a wireless transmission path of signal transmitted from the base station to the terminal, and uplink (UL) refers to a wireless transmission path of signal transmitted from the terminal to the base station.

Although embodiments are described with reference to the 5G system based on the LTE or LTE-A system, embodiments of the disclosure may also apply to other communication systems with similar technical background or channel form. Further, embodiments of the disclosure may be modified in such a range as not to significantly depart from the scope of the disclosure under the determination by one of ordinary skill in the art and such modifications may be applicable to other communication systems.

Figure 1:
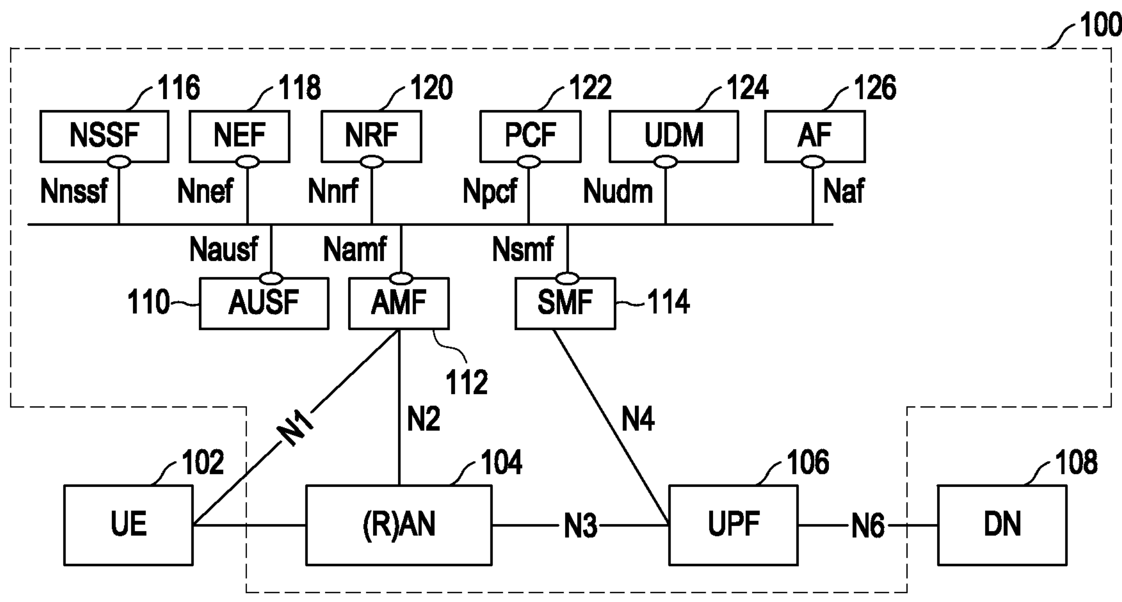
FIG. 1 illustrates a network architecture for a mobile communication system according to an embodiment of the present disclosure.

FIG. 1 illustrates a network architecture for a mobile communication system according to an embodiment of the present disclosure.

Referring to FIG. 1, a mobile communication network (e.g., a mobile communication system, a 5G system, or a 5G core network (CN)) 100 for servicing a UE 102 may include a network function entity such as at least one a radio access network (R)AN 104, a user plane function (UPF) 106, an authentication server function (AUSF) 110, an access and mobility management function (AMF) 112, a session management function (SMF) 114, a network slice selection function (NSSF) 116, a network exposure function (NEF) 118, a network repository function (NRF) 120, a policy control function (PCF) 122, a unified data management (UDM) 124, or an application function (AF) 126.

The UE 102 may access the 5G system 100 through the RAN 104 (e.g., a base station (BS) or a next generation node B (gNB)).

The AMF 112 may manage mobility of the UE 102. The SMF 114 may manage a packet data network connection (e.g., a protocol data unit (PDU) session) provided to the UE 102. The PCF 122 may manage and enforce the service policy, the billing policy, or the PDU session policy of the mobile communication service for the UE 102. The UDM 124 may store and manage information (e.g., subscriber information) about subscribers of the 5G system 100.

The NEF 118 may access information for managing UEs in the 5G system 100 to process at least one of subscription to a mobility management event of a specific UE (e.g., the UE 102), subscription to a session management event of the UE, a request for session-related information, charging information configuration of the UE, or a PDU session policy change request for the UE. The NEF 118 may be connected to network functions (NFs) (e.g., the AUSF 110, the UDM 124, or the AF 126) of the 5G core network, and may transfer information about a UE (e.g., the UE 102) to the NFs or may report the information about the UE 102 to the outside (e.g., a service provider).

The RAN 104 (e.g., 5G-RAN) may include a base station (e.g., gNB) that provides a wireless communication function to the UE 102, and may be denoted (R)AN. The UPF 106 may serve as a gateway for transferring packets transmitted and received by the UE 102. The UPF 106 may be connected to a data network (DN) 108 to transmit data packets generated in the 5G system 100 to the data network 108. For example, the data network 108 may be connected to an external network (e.g., the Internet), and the UPF 106 may route data packets sent by the UE 102 to the Internet via the data network 108.

In the disclosure, the network technology may refer to the standards (e.g., TS 23.501, TS 23.502, TS 23.503, etc.) defined by the international telecommunication union (ITU) or 3GPP, and the network function entities included in the network architecture of FIG. 1 may mean a physical entity or may mean software that performs an individual function or hardware combined with software. In FIG. 1, the reference denotation N1, N2, N3, . . . , or Nxxx denotes a known interface between NFs in the 5G system 100 (e.g., the 5G core network 5GC). A conceptual link connecting network functions (NFs) in the 5G system 100 may be defined as a reference point.

In an embodiment, the mobile communication network 100 may allow the service provider (not shown) to provide a service such as QoS support, traffic offloading, or provisioning of a UE route selection policy (URSP) for the UE 102 through, e.g., the NEF 118. The service provider needs to identify the UE to use the API function for the UE 102 subscribing to the mobile communication network 100. For example, the service provider may use at least one of the following identification information to identify the UE 102:

SUPI (subscription permanent identifier);

MSISDN (mobile subscriber ISDN (integrated services digital network) number); and/or IP address.

Here, it is recommended that the SUPI is not used outside the mobile communication network 100 due to the subscriber information exposure issue, and the MSISDN may not be suitable for use by the service provider due to the personal information exposure issue. In the case of an IP address, when the network address translation (NAT) is present between the network of the service provider and the mobile communication network, a plurality of UEs may use the same IP address, and thus may not be suitable to be used to identify the UE 102.

In embodiments of the disclosure, instead of the SUPI or MSIDSN which may expose the user's personal information or the IP address that may not uniquely identify the UE 102, a digital user identifier that may be used for the service provider to identify the UE 102 may be pre-configured. When the digital user identifier to be used by the service provider is registered in the UDM 124 before the service, it may be difficult for the service provider to identify whether the user who wants to receive the service actually uses the UE 102.

Embodiments of the disclosure may bind the digital user identifier that may be used for the service provider to identify the user (e.g., a subscriber of the service provider) to receive the service with the UE 102 subscribing to the mobile communication network 100. The service provider may uniquely identify the UE 102 using the digital user identifier without risk of exposure of personal information to use an API service (e.g., traffic QoS change, traffic offloading, or USRP delivery) provided by the mobile communication network 100.

In an embodiment, the digital user identifier may be referred to as an AF specific UE identifier in the mobile communication system 100. In an embodiment, the digital user identifier may include a generic public subscription identifier (GPSI). The digital user identifier such as GPSI may be pre-registered in the mobile communication network 100 (e.g., the UDM 124) to be used by the service provider. The mobile communication network may designate a digital user identifier for each AF such as the service provider and bind the digital user identifier with subscriber information about the UE 102.

Figure 2:
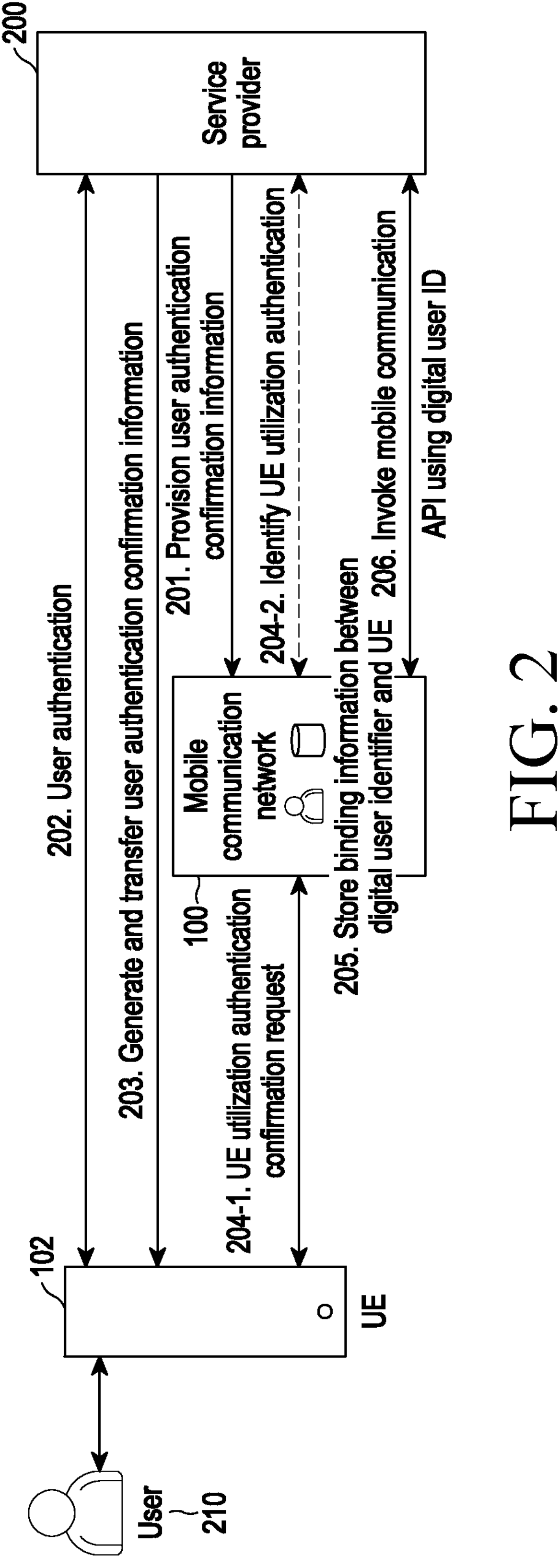
FIG. 2 illustrates user authentication according to an embodiment of the present disclosure.

FIG. 2 illustrates user authentication according to an embodiment of the present disclosure.

Referring to FIG. 2, the user 210 may use the service provided by the service provider 200 using the mobile communication UE (e.g., the UE 102). The user 210 is subscribed to the service provider 200 to use the service of the service provider 200, and the service provider 200 may uniquely identify the user 210 using the digital user identifier (ID).

In operations 202 and 203, the user 210 may log in to the service of the service provider 200 through user authentication (e.g., digital user authentication) to use the service provided by the service provider 200. The user authentication may be performed by transferring the ID (e.g., user account ID) and password of the user 210 to the service provider 200 through the UE 102 (e.g., operation 505 of FIG. 5) and identifying the ID and password and transferring the result to the UE 102 by the service provider 200 (e.g., operation 506 of FIG. 5) or through biometric recognition for identifying biometric information about the user 210 by the UE 102. The biometric recognition that may be utilized for user authentication may include at least one of fingerprint recognition, iris recognition, or face recognition, and the biometric information may be stored in the UE 102 owned by the user 210.

The UE 102 may be registered in the mobile communication system (e.g., the mobile communication network 100) operated by the mobile communication provider, and the user 210 may use or consume the service provided by the service provider 200 through the UE 102.

In an embodiment, the UE 102 may include an application (e.g., the UE application 102*c*) that provides user authentication, and may transfer user authentication confirmation information (e.g., at least one of the digital user identifier (ID), service ID/port ID, or ID verification information of operation 507) received through the application 102*c* to a modem (e.g., the UE modem 102*a*). In operation 204-1, the UE 102 may transmit the user authentication confirmation information to the service provider 200 through the mobile communication network 100 (e.g., the AUSF 110) and may request the service provider 200 to confirm user device utilization authentication (e.g., operations 507 to 512).

In an embodiment, the service provider 200 may provide a service to the user 210 through the UE 102 by using the mobile communication network 100. The service provider 200 may have its own subscriber management function for providing the service, apart from the registration information about the user 210 that may be stored in the mobile communication network 100. The service provider 200 may include a user authentication function (e.g., user authentication AF) that performs user authentication in operation 202 to allow the user 210 to use the service of the service provider 200. The service provider 200 may include an ID provider capable of authenticating the ID (e.g., a digital user identifier) of the user 210.

The mobile communication network 100 may provide a data transmission/reception service to the UE 102, and may include, e.g., at least one of network function entities of the mobile communication network 100 illustrated in FIG. 1.

The mobile communication network 100 may provide an application program interface (API) to the service provider 200. In operation 201, the service provider 200 may provision the user authentication confirmation information to the mobile communication network 100 through the application program interface (e.g., operations 501 to 504 of FIG. 5),In operation 204-1, the mobile communication network 100 (e.g., the AUSF 110) may receive a UE utilization authentication confirmation request (e.g., the digital user identifier binding request of operations 509 and 510) from the UE 102 and, in operation 204-2, obtain UE utilization authentication information (e.g., the verification result of operation 514 or 515) about the UE 102 through the configured user authentication confirmation information and, in operation 205, store binding information between the digital user identifier and the UE 102 (e.g., operation 516 of FIG. 5). In operation 206, upon receiving a mobile API utilization request of the service provider 200 for the user 210 corresponding to the UE 102 (e.g., operation 525 of FIG. 5), the mobile communication network 100 (e.g., the NEF 118) may identify what subscriber device (e.g., the UE 102) the digital user identifier of the API utilization request is bounded based on the binding information (e.g., operations 526 and 527).

Figure 3:
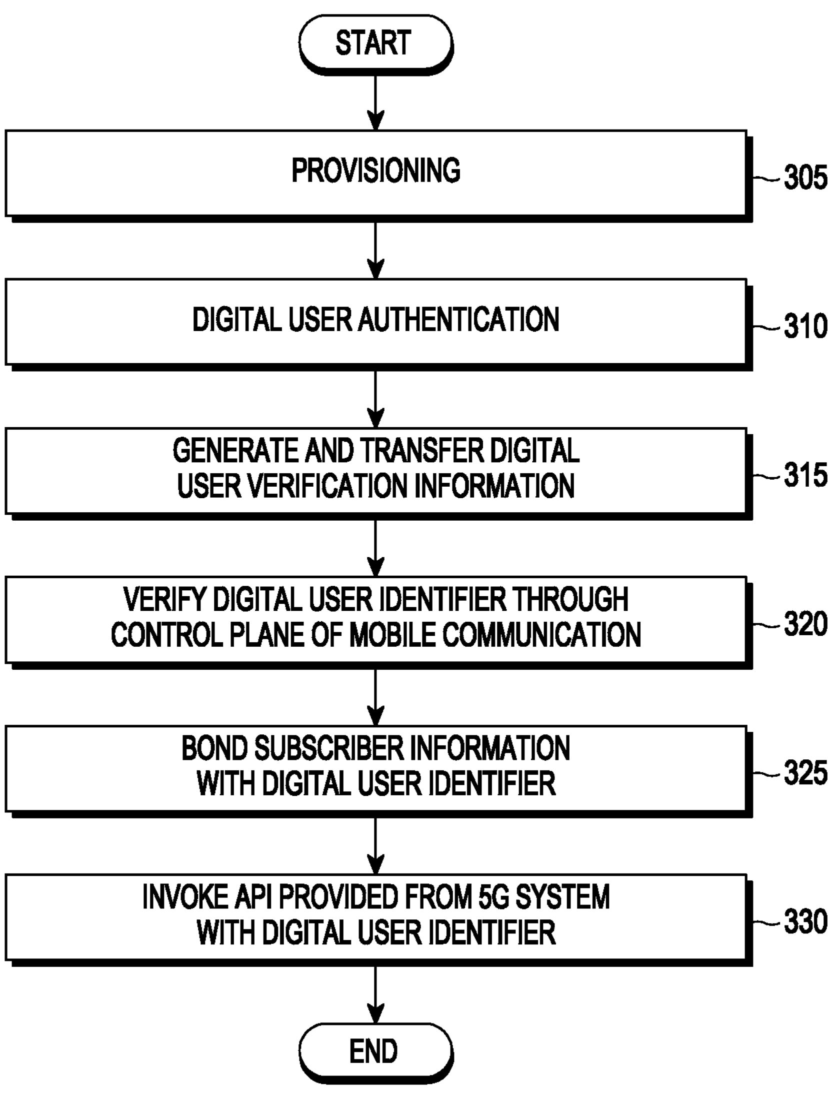
FIG. 3 illustrates a flowchart of procedure for binding a digital user identifier with subscriber information according to an embodiment of the present disclosure.

FIG. 3 illustrates a flowchart of procedure for binding a digital user identifier with subscriber information in a mobile communication network according to an embodiment. In various embodiments, at least one of operations to be described below may be omitted, modified, or reordered.

Referring to FIG. 3, in operation 305, the mobile communication network 100 (e.g., the AUSF 110 and/or the NEF 118) may perform provisioning for authenticating digital user identifier verification information in cooperation with the service provider 200 (e.g., a user authentication AF or an application server (AS)). (e.g., operations 501 to 504 of FIG. 5)

In operation 310, the UE 102 and the service provider 200 may perform digital user authentication. In an embodiment, the digital user authentication may include transmitting login information (e.g., a user account ID and a password ("ID/PW")) about the user 210 to the service provider 200 and authenticating the login information by the service provider 200 (e.g., operation 505 of FIG. 5). In an embodiment, the digital user authentication may include authenticating biometric information (e.g., fingerprint, iris, and/or face) about the user 210 by the UE 102 and transmitting the authentication result to the service provider 200.

In operation 315, the service provider 200 may issue digital user identifier confirmation information (e.g., user authentication confirmation information or digital user identifier confirmation information) and may transfer the digital user identifier confirmation information to the UE 102 (e.g., the UE application 102*c*) (e.g., operation 506).

In operation 320, the mobile communication network 100 (e.g., the AUSF 110) may receive the digital user identifier verification information from the UE 102 through the control plane (e.g., operations 507 to 510) and may verify the digital user identifier of the UE 102 according to the digital user identifier verification information (e.g., operations 511 to 514 or 515).

In operation 325, the mobile communication network 100 (e.g., the AUSF 110) may bind the verified digital user identifier with the subscriber information about the UE 102 and store the same in a database (e.g., the UDM 124) for managing subscriber information (e.g., subscription data management (SDM) information) about the mobile communication network 100. (e.g., operation 516 of FIG. 5). In an embodiment, the mobile communication network 100 (e.g., the AUSF 110) may report the binding result between the digital user identifier and the subscriber information to, e.g., the service provider 200 (e.g., the user authentication AF 200*a*) and/or the UE 102 (e.g., the UE application 102*c*). (e.g., operations 517 to 524)

In operation 330, the mobile communication network 100 (e.g., the AF 126 or NF (not shown)) may process an API invocation including the digital user identifier, based on the binding information (e.g., operations 525 to 527). The API invocation may include, e.g., at least one of a traffic offloading policy request, a UE policy request, or a quality of service (QoS) request.

Figure 4:
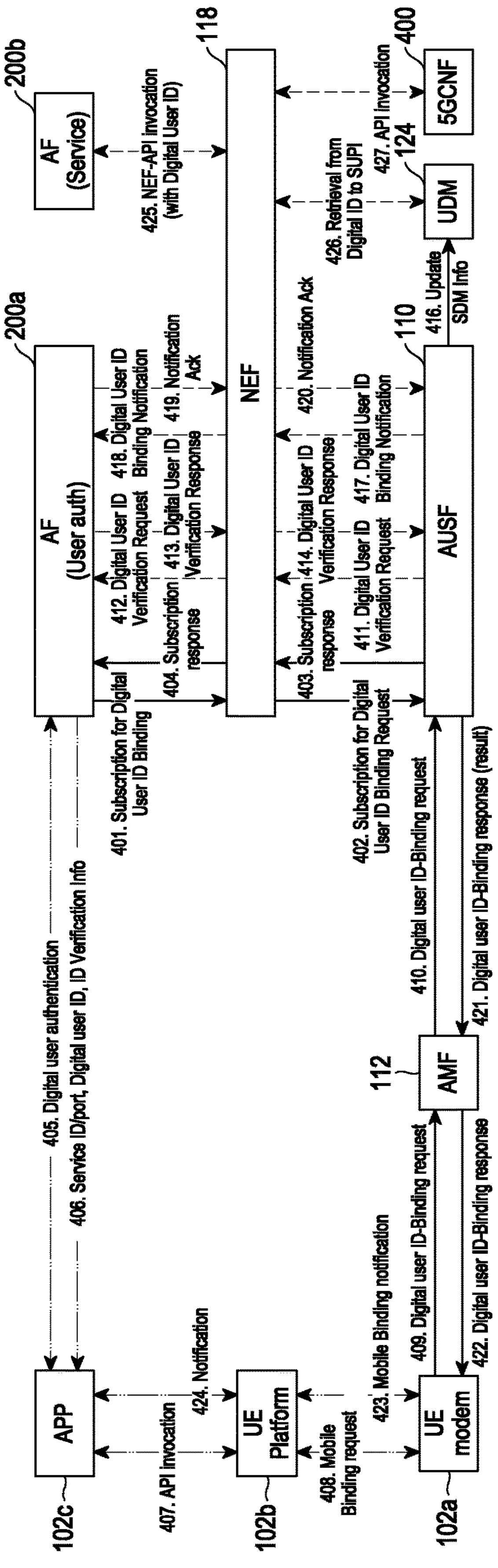
FIG. 4 illustrates a UE binding procedure using a digital user identifier according to an embodiment of the present disclosure.

FIG. 4 illustrates a binding procedure between a digital user identifier and a UE based on a UE request according to an embodiment of the present disclosure. In an embodiment, the service provider 200 may include a user authentication AF 200*a* and a service AF 200*b*. In an embodiment, the UE 102 may include a UE modem 102*a*, a UE platform 102*b*, and a UE application 102*c*. In various embodiments, at least one of operations to be described below may be omitted, modified, or reordered.

Referring to FIG. 4, in operations 401, 402, 403, and 404, the service provider 200 may generate an AF request for a digital user identifier binding subscription request through the user authentication AF 200*a* and may transmit the AF request to the NEF 118. In an embodiment, the AF request may include provisioning information for identifying the digital user identifier. In an embodiment, operations 401, 402, 403, and 404 may be substantially the same as operations 501, 502, 503, and 504.

In operations 405 and 406, the service provider 200 (e.g., the user authentication AF 200*a*) may perform user authentication (e.g., digital user authentication), may generate user authentication confirmation information, and may transmit the user authentication confirmation information to the UE application 102*c*. In an embodiment, operations 405 and 406 may be substantially the same as operations 505 and 506.

In operations 407 and 408, after the user authentication is successfully performed, the UE application 102*c* may transmit a mobile binding request to the UE modem 102*a* through the UE platform 102*b*. In an embodiment, operations 407 and 408 may be substantially the same as operations 507 and 508.

In operations 409 and 410, the UE modem 102*a* may transfer a digital user identifier binding request corresponding to the mobile binding request to an NF (e.g., the AUSF 110) in charge of digital user identifier binding via the AMF 112. In an embodiment, operations 409 and 410 may be substantially the same as operations 509 and 510.

In operations 410 to 414, the AUSF 110 may verify the digital user identifier included in the digital user identifier verification information received from the UE 102 through the digital user identifier binding request, through the NEF 118 and the service provider 200 based on the provisioning information stored in the AUSF 110 through operations 401 to 404. In an embodiment, operations 410 to 414 may be substantially the same as operations 510 to 514.

In an embodiment, instead of omitting operations 410 to 414, the AUSF 110 may verify the digital user identifier by itself (e.g., internally) through the provisioning information provided by the service provider 200 (e.g., the user authentication AF 200*a*) through operations 401 to 404.

In operation 416, the AUSF 110 may transfer, to the UDM 124, binding information indicating that the user (e.g., the user 210) of the digital user identifier is bound for specific subscriber information (e.g., subscriber information about the UE 102) about the mobile communication network 100. The UDM 124 may store the binding information. In an embodiment, operation 416 may be substantially the same as operation 516.

In operations 417 to 420, the AUSF 110 may transfer a digital user binding notification indicating that binding between the user 210 of the digital user identifier and the UE 102 is successful to the service provider 200 (e.g., the user authentication AF 200*a*) through the NEF 118. In an embodiment, when the notification of the AF binding result is set according to the provisioning information of operations 401 to 404, the AUSF 110 may transmit the digital user binding notification to the user authentication AF 200*a*. In an embodiment, operations 417 to 420 may be substantially the same as operations 517 to 520.

In operations 421 to 424, the AUSF 110 may transfer a digital user binding response indicating that binding between the digital user identifier and the UE 102 succeeds to the UE application 102*c* through the UE modem 102*a* and the UE platform 102*b*. In an embodiment, operations 421 to 424 may be substantially the same as operations 521 to 524.

In operations 425 to 427, the service provider 200 (e.g., the service AF 200*b*) may invoke the service provided by the mobile communication system 100 to the NEF 118 using the digital user identifier managed by the service provider 200 (e.g., the user authentication AF 200*a*). The NEF 118 may ask the UDM 124 to convert the digital user identifier into subscription identification information (e.g., a subscription permanent identifier (SUPI) or an international mobile subscriber identity (IMSI)) used in the mobile communication network 100, and may transfer an invocation (e.g., an API invocation) for the service to the NF 400 related to the invoked service of the mobile communication network 100 using the subscription identification information. In an embodiment, operations 425 to 427 may be substantially the same as operations 525 to 527.

Figure 5A:
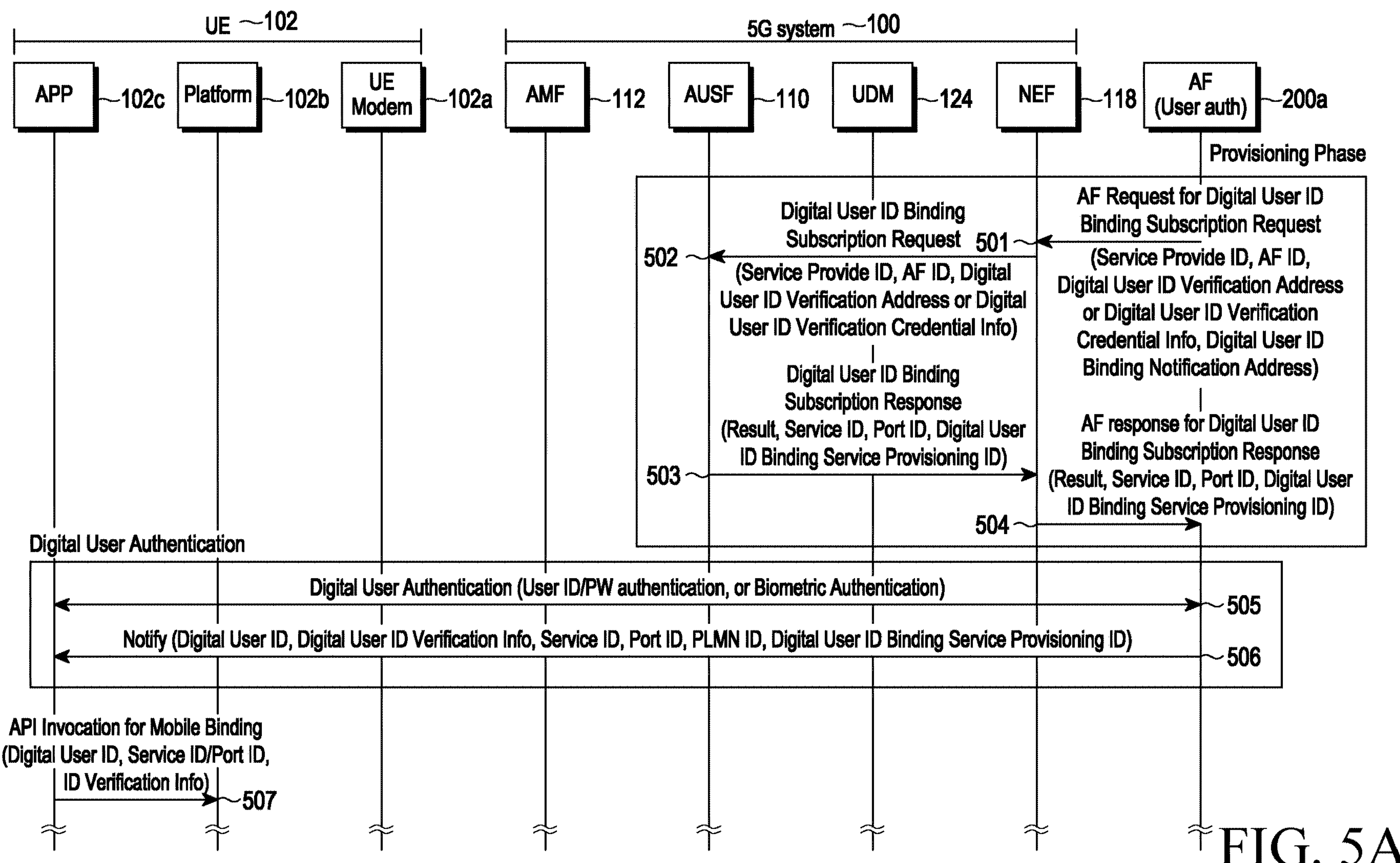
FIGS. 5A, 5B, and 5C illustrate a signal flowchart for a UE binding procedure using a digital user identifier according to an embodiment of the present disclosure.
Figure 5B:
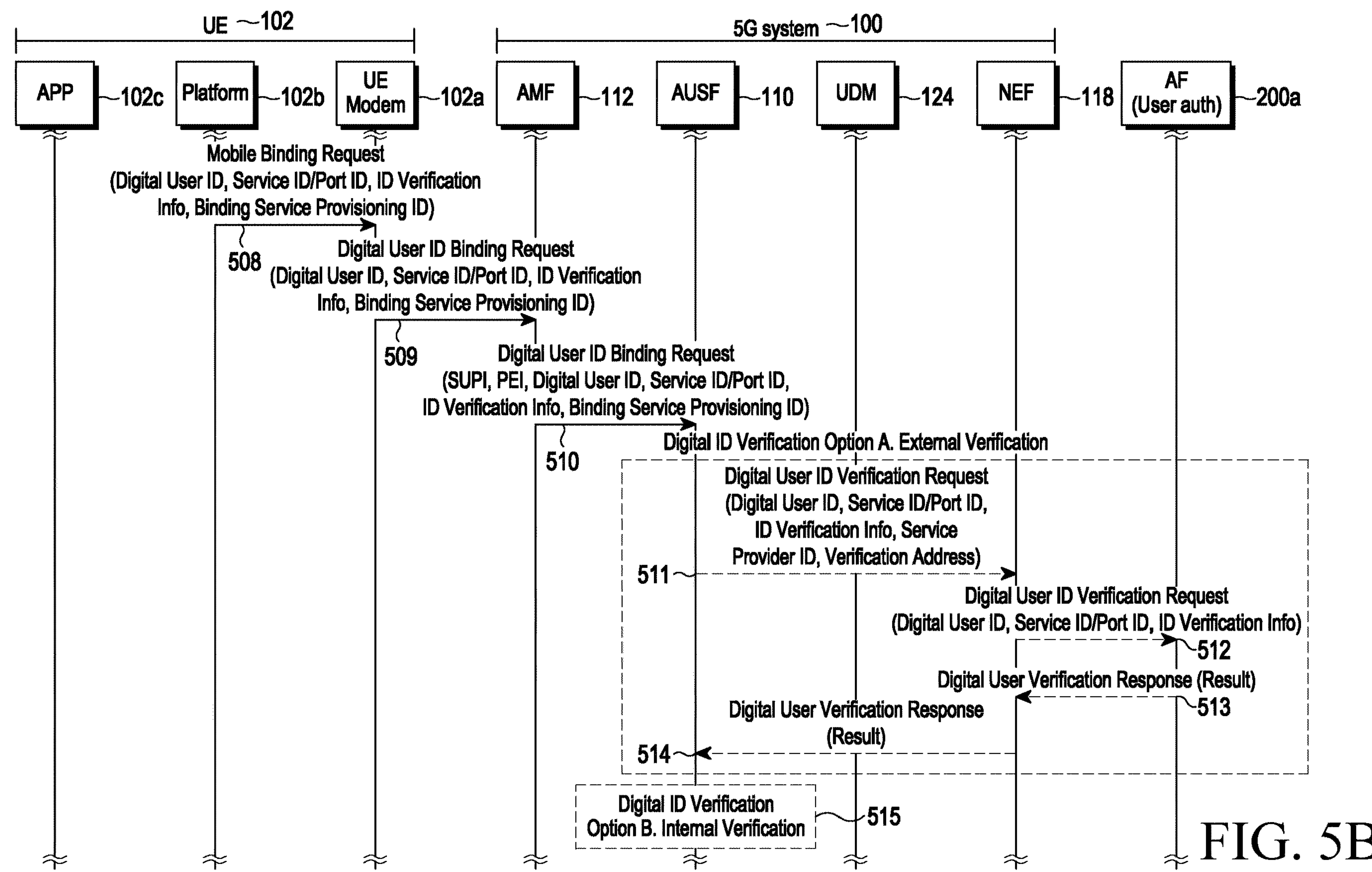
Figure 5C:
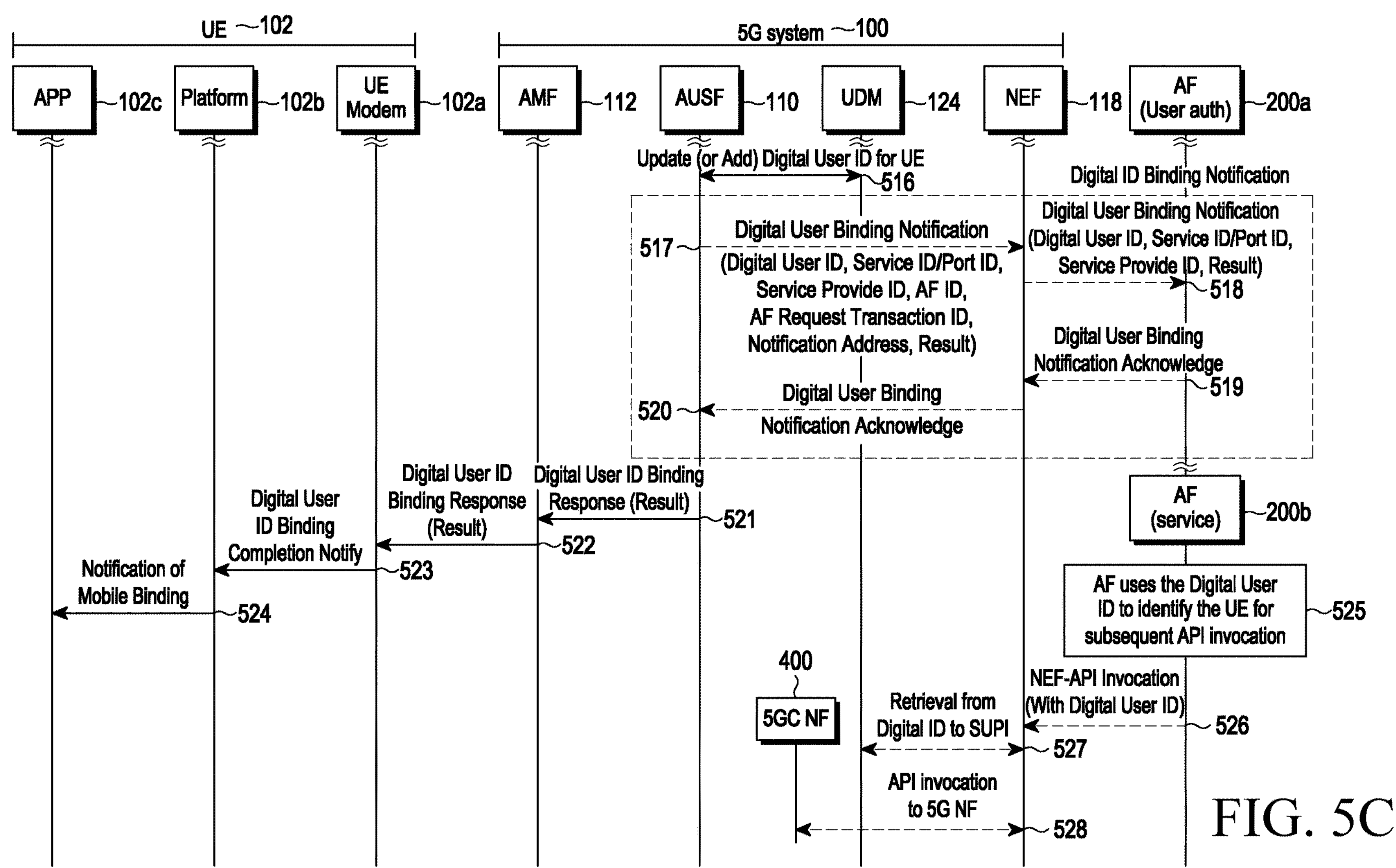

FIGS. 5A, 5B, and 5C illustrate a signal flowchart illustrating a binding procedure between a digital user identifier and a UE, according to an embodiment of the present disclosure. In an embodiment, the service provider 200 may include a user authentication AF 200*a* and a service AF 200*b*. In an embodiment, the UE 102 may include a UE modem 102*a*, a UE platform 102*b*, and a UE application 102*c*. In an embodiment, the mobile communication network 100 (e.g., a 5G system) may include an AMF 112, an AUSF 110, a UDM 124, and an NEF 118. In various embodiments, at least one of operations to be described below may be omitted, modified, or reordered.

Referring to FIG. 5, in operation 501, the service provider 200 (e.g., the user authentication AF 200*a*) may include provisioning information for authentication of the digital user identifier verification information in an AF request for a digital user identifier binding subscription request and transfer the provisioning information to the mobile communication network 100 (e.g., the NEF 118).

In an embodiment, the provisioning information included in the AF request may include at least one of the following parameters:

- a first indicator indicating a provisioning request for binding a digital user identifier;
- AF identifier (AF ID);
- service identification information;
- service provide ID for identifying the service provider 200;
- a verification address ("digital user ID verification address") indicating a server (e.g., the user authentication AF 200*a*) provided by a service provider (e.g., the service provider 200) capable of identifying the digital user identifier;
- security key information for identifying the digital user identifier; for example, credential info about the user authentication AF 200*a*; and/or
- binding notification address ("digital user ID binding notification address") indicating the server (e.g., user authentication AF 200*a*) to report the binding result of the digital user identifier and the subscriber information. In an embodiment, the user AF 200*a* may include the second indicator for requesting to report success in binding between the digital user identifier and the subscriber information in the AF request. When the second indicator is included in the provisioning information, the AUSF 110 may transfer a digital user binding notification for reporting that binding of the digital user identifier and subscriber information has been successfully performed to a server (e.g., the user authentication AF 200*a*) corresponding to the binding notification address through the NEF 118. A detailed description of reporting the binding result will be made below in operations 516 to 519.

The NEF 118 may receive the AF request from the user authentication AF 200*a*, and identify that the AF request includes a first indicator indicating a subscription request for digital user identifier binding. In operation 502, the NEF 118 may transfer the AF request to an NF (e.g., the AUSF 110) that processes the digital user identifier binding in response to the inclusion of the first indicator. The AUSF 110 may obtain parameters included in the AF request. In an embodiment, the NEF 118 may transfer the AF request to the AUSF 110 through a designated message (e.g., a subscription request message). In an embodiment, the NEF 118 may store the AF request in a related unified data repository (UDR) (not shown), and the UDR may transfer a data management (DM) notification related to the AF request to the AUSF 110, thereby allowing the AUSF 110 to obtain parameters corresponding to the digital user identifier binding.

In an embodiment, the message (e.g., subscription request message) transferred to the AUSF 110 by the NEF 118 may include at least one of the following parameters:

- service provide ID;
- AF identifier (AF ID);
- address ("digital user ID verification address") of server (e.g., user authentication AF 200*a*) capable of verifying the digital user identifier;
- security key information for verifying digital user identifier (e.g., digital user ID verification credential information); and/or
- second indicator requesting reporting of binding result between digital user identifier and subscriber information and address to which the binding result is to be reported ("digital user ID binding notification address") (e.g., address of NEF 118).

In operation 503, the AUSF 110 may transfer a response (e.g., a digital user identifier binding subscription response) to the subscription request for the digital user identifier binding to the NEF 118.

In an embodiment, the AUSF 110 may store at least one of the following parameters, based on the subscription request message received from the NEF 118:

- service provider ID; and
- provisioning information for verifying the digital user identifier verification information provided to the UE 102:
- (i) Example 1) Certificate or credential information for the user authentication AF 200*a* of the service provider 200; and
- (ii) Example 2) Authentication key (e.g., Diffie-Hellman (DH) key) of the service provider 200;
- identification information (AF ID) identifying the user authentication AF 200*a* of the service provider 200;
- service ID assigned by the AUSF 110;
- a service identifier (service ID) that may be predefined or a service identifier for a user identification service provided in the 5G system 100; and
- a port identifier (port ID) that may be predefined, or an identifier for identifying a service provided by the UE modem 102*a*.

The subscription response message sent by the AUSF 110 to the NEF 118 may include at least one of the following parameters:

- Result ("result") for provisioning and subscription service request;
- service identifier: Information for identifying the service (e.g., user identification service) provided in the 5G system 100;
- port identifier: Information for identifying a plurality of services when the UE modem 102*a* provides the plurality of services to the UE platform 102*b* or UE application 102*c*; and
- digital user identifier binding service provisioning identifier: The identifier may be transferred to the UE application 102*c* by the user authentication AF 200*a*.

The identifier of the UE application 102*c* may be transferred back to the AUSF 110 via the mobile communication network 100 (e.g., the AMF 112) through the UE modem 102*a*. The AUSF 110 may determine which provisioning information is to be used based on the identifier. In an embodiment, this identifier may be used to cancel provisioning.

In operation 505, the UE 102 (e.g., the UE application 102*c*) may perform digital user authentication with the service provider 200 (e.g., the user authentication AF 200*a*). In an embodiment, the UE application 102*c* may transmit login information (e.g., a user account ID and a password ("ID/PW")) about the user 210 to the user authentication AF 200*a* such that the user authentication AF 200*a* authenticates the login information. In an embodiment, the UE application 102*c* may authenticate biometric information (e.g., at least one of a fingerprint, an iris, or a face) input from the user 210, and may transmit the authentication result to the user authentication AF 200*a*.

In operation 506, the service provider 200 (e.g., the user authentication AF 200*a*) may transfer digital user identifier verification information to the UE 102 (e.g., the UE application 102*c*). In an embodiment, the user authentication AF 200*a* may generate information (e.g., digital user identifier verification information) capable of identifying user authentication according to an authentication result of the login information or an authentication result of the biometric information, and may transfer a notification message including the digital user identifier verification information to the UE application 102*c*.

In an embodiment, the user authentication AF 200*a* of the service provider 200 may generate the digital user identifier verification information after performing user authentication by various methods (e.g., an authentication result of login information or biometric information).

In an embodiment, the digital user identifier verification information may include at least one of the following parameters:

- digital user identifier;
- identifier of the service provider 200 managing the user identifier or the ID provider (e.g., user authentication AF 200*a*) managing the user identifier;
- user's authority information;
- public key information about service provider 200 or ID provider (e.g., user authentication AF 200*a*); and
- signature information about service provider 200 or ID provider (e.g., user authentication AF 200*a*).

In an embodiment, the notification message transmitted by the user authentication AF 200*a* of the service provider 200 may include at least one of the following parameters and be transferred to the UE application 102*c*:

- digital user identifier;
- digital user identification verification information;
- service ID;
- port ID;
- digital user identifier binding service provisioning identifier (e.g., assigned by AUSF 110 in operation 503); and
- identifier of the mobile communication network 100 to which the UE 102 of the user 210 subscribes: e.g., public land mobile network (PLMN) ID.

In operation 507, the UE application 102*c* may transmit an API invocation for a mobile binding request to the UE platform 102*b* in response to receiving an instruction to transfer mobile binding information or information corresponding thereto from the user authentication AF 200*a*.

In an embodiment, the UE platform 102*b* may include an API provided from the operating system (OS) of the UE 102 to the UE application 102*c*, or may include an API created in a programming language executable on a web browser such as JavaScript. The API invocation may include at least one of the following parameters:

- digital user identifier;
- service ID
- port ID;
- digital user identification verification information; and
- digital user identifier binding service provisioning identifier (e.g., assigned by AUSF 110 in operation 503).

In an embodiment, the API invocation may be initiated from the UE application 102*c* or may be initiated from the UE platform 102*b*, according to the implementation of the UE 102.

In operation 508, the UE platform 102*b* may transfer the mobile binding request to the UE modem 102*a*. In an embodiment, the mobile binding request may include at least one of the following parameters:

- digital user identifier;
- service ID
- port ID;
- digital user identification verification information; and
- digital user identifier binding service provisioning identifier (e.g., assigned by AUSF 110 in operation 503)

In operation 509, the UE modem 102*a* may transmit a digital user identifier binding request message (e.g., a non-access stratum (NAS)) to the 5G system 100 (e.g., the AMF 112), based on the mobile binding request received from the UE application 102*c* directly or through the UE platform 102*b*.

In an embodiment, the digital user identifier binding request message transferred from the UE 102 may include at least one of the following parameters:

- digital user identifier;
- service ID
- port ID;
- digital user identification verification information; and
- digital user identifier binding service provisioning identifier (e.g., assigned by AUSF 110 in operation 503).

In an embodiment, at least some of the above-described parameters may be included in the NAS message in a format recognizable by the 5G system 100, or may be included in the NAS message in the form of container information for transferring to an external application (e.g., the user authentication AF 200*a*) without interpretation by the 5G system 100.

In operation 510, the AMF 112 may select the AUSF 110 based on at least one of the service ID, the port ID, container information, or the digital user identifier binding service provisioning identifier included in the received digital user identifier binding request message, and may transfer the digital user identifier binding request message to the AUSF 110.

In an embodiment, the AMF 112 may select a network slice providing a service corresponding to the service identifier or forward the digital user identifier binding request message to a new AMF (not shown) providing the service.

In an embodiment, the digital user identifier binding request message transmitted from the AMF 112 to the AUSF 110 may further include an identifier (e.g., SUPI or permanent equipment identifier (PEI)) of the UE 102.

The AUSF 110 may determine to perform digital user identifier verification in response to the digital user identifier binding request message. In the embodiment of FIG. 5, it is illustrated that the AUSF 110 performs digital user identifier verification through the control plane of the mobile communication network 100. However, in various embodiments, operations described as being performed by the AUSF 110 may be performed by any other NF (e.g., the PCF 122, a binding support function (B SF) (not shown), or the NEF 118) in the mobile communication network 100.

In an embodiment, the AUSF 110 may perform digital user identifier verification according to at least one of two methods to be described below. A first method is to perform digital user identifier verification by transmitting a verification request for the digital user identifier to the AF (e.g., the user authentication AF 200*a*) that has generated the digital user identifier verification information, and may be performed through operations 511 to 514. A second method is that the AUSF 110 directly verifies the digital user identifier verification information received from the UE 102 using the digital user identifier verification credential information obtained by the AUSF 110 through the NEF 118 from the user authentication AF 200*a* in operations 501 and 502, and may be performed through operation 515.

In operation 511, the AUSF 110 may transmit a digital user identifier verification request message to the NEF 118. The digital user identifier verification request message may include at least one of the following parameters:

digital user identifier;
service ID
port ID;
digital user identification verification information;
service provide ID; and
identification information (e.g., AF request transaction ID) capable of searching for the verification address or the record of the AF request (e.g., AF request in operation 501) stored in the NEF 118.

In operation 512, the digital user identifier verification request message transmitted by the AUSF 110 to the NEF 118 may be transferred to the user authentication AF 200*a* through the NEF 118. The NEF 118 may identify that the AF request transaction ID included in the digital user identifier verification request message is the same as the AF request transaction ID capable of identifying the AF request received in operation 501, and may obtain the verification address included in the AF request. The NEF 118 may request digital user verification by transferring the digital user identifier verification request message to the user authentication AF 200*a* corresponding to the verification address.

In an embodiment, the digital user identifier verification request message transferred by the NEF 118 to the user authentication AF 200*a* of the verification address may include at least one of the following parameters:

digital user identifier;
service ID
port ID; and
digital user identification verification information.

In operation 513, the user authentication AF 200*a* may verify the digital user identifier verification information obtained from the digital user identifier verification request message. In an embodiment, the user authentication AF 200*a* may determine whether the digital user identifier verification information is appropriate or not, may include the result (e.g., the verification result) in the digital user identifier verification response message, and may transmit the result to the NEF 118. In an embodiment, when the digital user identifier verification information received in operation 512 matches the digital user identifier verification information provided in operation 506, the user authentication AF 200*a* may determine that the received digital user identifier verification information is appropriate (e.g., verification is successful).

In operation 514, the NEF 118 may transmit the digital user identifier verification response message to the AUSF 110.

In operation 515, the AUSF 110 may directly verify the digital user identifier verification information received in operation 510 by using the digital user identifier verification credential information received through the NEF 118 in operations 501 and 502. When the verification result received in operation 514 is successful or the verification result in operation 515 is successful, the AUSF 110 may proceed to operation 516.

In operation 516, the AUSF 110 may bind the subscriber information to the digital user identifier. In an embodiment, the AUSF 110 may bind the digital user identifier, which has been successfully verified, with the subscriber information about the UE 102 and store the same in the UDM 124 including a database managing subscriber information in the mobile communication network 100. If there is a stored existing digital user identifier, the AUSF 110 may update the subscriber information about the UDM 124 to include a new digital user identifier.

In an embodiment, the AUSF 110 may bind the digital user identifier with the subscriber identifier in the mobile communication network 100 and store the same in a separate database (not shown).

When the binding of the subscriber information about the UE 102 and the digital user identifier is successfully completed in operation 517, and when the provisioning information received in operation 502 includes the second indicator, the AUSF 110 may transmit a digital user binding notification message to the NEF 118.

In an embodiment, the digital user binding notification message may include at least one of the following parameters:

digital user identifier;
service ID
port ID;
service provide ID;
AF ID;
AF request transaction ID;
binding notification address indicating server (e.g., user authentication AF 200*a*) to which the binding result is to be reported; and
binding result of digital user identifier.

In operation 518, the digital user identifier binding notification message transmitted by the AUSF 110 to the NEF 118 may be transferred to the user authentication AF 200*a* through the NEF 118. The NEF 118 may identify that the AF request transaction ID included in the digital user identifier binding notification message is the same as the AF request transaction ID capable of identifying the AF request received in operation 501, and may obtain the binding notification address included in the AF request. The NEF 118 may transfer the digital user identifier binding notification message to the user authentication AF 200*a* corresponding to the binding notification address.

The digital user identifier binding notification message transferred by the NEF 118 to the user authentication AF 200*a* may include at least one of the following parameters.

digital user identifier;
service ID
port ID; and
binding result of digital user identifier.

In operation 519, the user authentication AF 200*a* may transfer a response (e.g., a digital user identifier binding notification ack) to the report of the binding result to the NEF 118.

In operation 520, the NEF 118 may transfer the digital user identifier binding notice ack to the AUSF 110. The AUSF 110 may determine that the digital user identifier binding is completed as the digital user identifier binding notification ack is received.

In operation 521, the AUSF 110 may transfer a digital user identifier binding response message corresponding to the digital user identifier binding request of operation 410 to the AMF 112. The response message may include at least one of the following parameters:

binding result of digital user identifier (e.g., success or failure); and reason for failure when binding of digital user identifier fails (e.g., mismatch of digital user identifier verification information, or server not responsive).

In operation 522, the AMF 112 may transfer the digital user identifier binding response message to the UE 102 (e.g., the UE modem 102*a*).

In operation 523, the UE modem 102*a* may transfer a digital user identifier binding response message from the AMF 112 to the UE platform 102*b* through the API.

In operation 524, the UE platform 102*b* may include the binding result (e.g., success or failure) included in the digital user identifier binding response message in the digital user identifier binding complete announcement message and transmit the same to the UE application 102*c*.

In operations 525 to 527, the digital user identifier may be utilized for an API invocation (e.g., a traffic offloading policy request, a UE policy request, or a QoS request) provided by the mobile communication network 100.

In operation 525, the service provider 200 (e.g., the service AF 200*b*) may generate an API invocation related to the service provided by the mobile communication network 100. The API invocation may include a digital user identifier to identify the UE 102. The API invocation may be transmitted for a traffic offloading policy request, a UE policy request, or a QoS request.

In operation 526, the service AF 200*b* may transmit the API invocation to the mobile communication network 100 (e.g., the NEF 118). In operation 527, the NEF 118 may obtain a subscription identifier (e.g., SUPI) of the UE 102 corresponding to the digital user identifier from the UDM 124.

In operation 528, the NEF 118 may transfer the API invocation to the 5G NF 400 (e.g., the PCF 122) related to the API invocation using the SUPI obtained from the UDM 124. In an embodiment, the mobile communication network 100 may provide the requested service of the API invocation to the UE 102 through the NF 400 based on the digital user identifier included in the API invocation.

Figure 6:
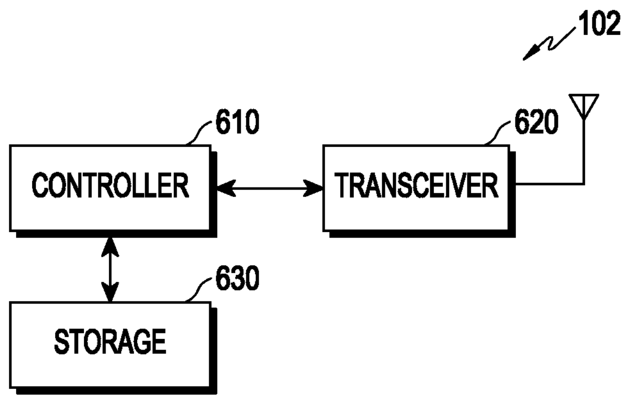
FIG. 6 illustrates a structure of a UE according to an embodiment of the present disclosure.

FIG. 6 illustrates a UE according to an embodiment of the present disclosure.

Referring to FIG. 6, a UE 102 may include a transceiver 620, a controller (e.g., processing circuit) 610, and a storage (e.g., memory) 630. The transceiver 620, controller 610, and storage 630 of the UE 102 may be operated according to at least one or a combination of the above-described embodiments. In an embodiment, the controller 610 may include at least one of a UE modem 102*a*, a UE platform 102*b*, or a UE application 102*c* that may operate according to at least one or a combination of the above-described embodiments.

The components of the UE 102 are not limited to the shown examples. According to an embodiment, the UE 102 may include more or fewer components than the above-described components. Further, at least one of the transceiver 620, the controller 610, and the storage 630 may be implemented in the form of a single chip.

According to an embodiment, the transceiver 620 may include a transmitter and a receiver. The transceiver 620 may transmit/receive signals to/from a base station (e.g., RAN 104). The signals may include control information and data. The transceiver 620 may include a radio frequency (RF) transmitter for frequency-up converting and amplifying signals transmitted and an RF receiver for low-noise amplifying signals received and frequency-down converting the frequency of the received signals. The transceiver 620 may receive signals via a radio channel, output the signals to the controller 610, and transmit signals output from the controller 610 via a radio channel.

The controller 610 may control a series of procedures to allow the UE 102 to operate according to one or a combination of the above-described embodiments. For example, the controller 610 may perform or control the operations of the UE 102 to perform at least one or a combination of embodiments of the disclosure. The controller 610 may include at least one processor. For example, the controller 610 may include a communication processor (CP) that performs control for communication and an application processor (AP) that controls an upper layer, such as an application program.

The storage 630 may store control information (e.g., the digital user identifier, service ID, port ID, digital user identifier verification information, or provisioning identifier obtained from the UE 102) or data and may have an area for storing data generated when controlling by the controller 610 and data necessary for the controller 610 to control.

Figure 7:
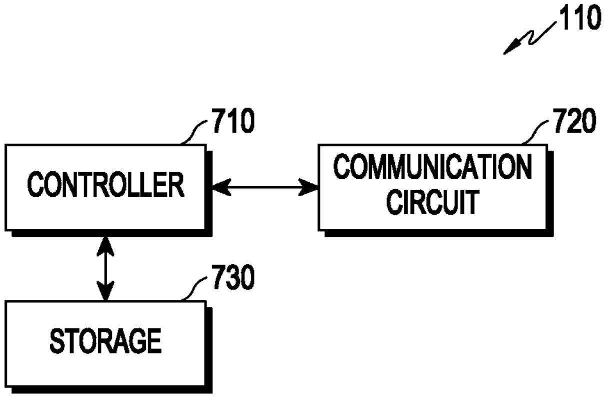
FIG. 7 illustrates a structure of a network entity according to an embodiment of the present disclosure.

FIG. 7 illustrates a network entity according to an embodiment of the present disclosure. In an embodiment, the illustrated network entity may include an AUSF 110. In an embodiment, the illustrated network entity may include at least one network function (NF) of the mobile communication network 100.

Referring to FIG. 7, the AUSF 110 may include a communication circuit 720 (e.g., communicator), a controller (e.g., processing circuit) 710, and a storage (e.g., memory) 730. The communication circuit 720, controller 710, and storage 730 of the AUSF 110 may be operated according to at least one or a combination of the above-described embodiments. The components of the AUSF 110 are not limited to the shown examples. According to an embodiment, the AUSF 1700 may include more or fewer components than the above-described components. Further, at least one of the communication circuit 720, the controller 710, and the storage 730 may be implemented in the form of a single chip.

According to an embodiment, the communication circuit 720 may include a transmitter and a receiver. The communication circuit 720 may transmit/receive messages to/from the UE 102, other network entities of the mobile communication network 100, or the service provider 200 (e.g., the user authentication AF 200*a* and/or the service AF 200*b*).

The controller 710 may control a series of procedures to allow the AUSF 110 to operate according to one or a combination of the above-described embodiments. For example, the controller 710 may perform or control the operations of the AUSF 110 to perform at least one or a combination of embodiments of the disclosure. The controller 710 may include at least one processor. For example, the controller 710 may include a communication processor (CP)

that performs control for communication and an application processor (AP) that controls an upper layer, such as an application program.

The storage 730 may store control information (e.g., the service provision ID, AF ID, digital user identifier, service ID, port ID, digital user identifier verification information, digital user identifier credential information, provisioning identifier, verification address, or binding notification address obtained from the AUSF 110) or data and may have an area for storing data generated when controlling by the controller 710 and data necessary for the controller 710 to control.

According to an embodiment, the mobile communication network may manage binding information between the subscriber identifier of the mobile communication network and the digital user identifier used by the user subscribing to the service provider requesting the above-described service. The mobile communication network may allow the NF corresponding to the service intended by the user to the UE using the digital user identifier without exposing personal information.

According to an embodiment, a method for binding a user and a UE in a mobile communication system may include receiving 305 provisioning information for a user from a service provider, receiving 315 verification information and a digital user identifier from a UE completing user authentication for the service provider, verifying 320 the verification information using the provisioning information, the verification information being successfully verified, binding 325 the digital user identifier with the UE's subscriber information and store in a subscriber database, and providing 330 the user with a service corresponding to a service invocation in response to the service invocation including the digital user identifier from the service provider.

In an embodiment, the provisioning information may include at least one of a first indicator indicating a subscription request for digital user identifier binding, a service provide identifier identifying the service provider, an application function (AF) identifier, a verification address indicating a server for identifying the digital user identifier, security key information for identifying the digital user identifier, a second indicator requesting a report of a binding result between the digital user identifier and the subscriber information, or a binding notification address indicating a server to which the binding result is to be reported.

In an embodiment, receiving the digital user identifier and the verification information may include receiving, from the UE, a request message including at least one of a subscription identifier, the digital user identifier, a service identifier, a port identifier, the verification information, or a provisioning identifier indicating the provisioning information.

In an embodiment, verifying the verification information may include requesting the service provider to verify the verification information using the provisioning information and receive a verification result of the verification information from the service provider.

In an embodiment, the method may further include transmitting a binding result between the digital user identifier and the subscriber information to the service provider and/or the

UE.

According to an embodiment, a network entity for binding a user and a UE in a mobile communication system may include a communication circuit 720 and a controller 710. The controller may be configured to receive 305 provisioning information for a user from a service provider, receive 315 verification information and a digital user identifier from a UE completing user authentication for the service provider, verify 320 the verification information using the provisioning information, the verification information being successfully verified, bind 325 the digital user identifier with the UE's subscriber information and store in a subscriber database, and provide 330 the user with a service corresponding to a service invocation in response to the service invocation including the digital user identifier from the service provider.

In an embodiment, the provisioning information may include at least one of a first indicator indicating a subscription request for digital user identifier binding, a service provide identifier identifying the service provider, an application function (AF) identifier, a verification address indicating a server for identifying the digital user identifier, security key information for identifying the digital user identifier, a second indicator requesting a report of a binding result between the digital user identifier and the subscriber information, or a binding notification address indicating a server to which the binding result is to be reported.

In an embodiment, the controller may be configured to receive, from the UE through the communication circuit, a request message including at least one of a subscription identifier, the digital user identifier, a service identifier, a port identifier, the verification information, or a provisioning identifier indicating the provisioning information.

In an embodiment, the controller may be configured to request the service provider to verify the verification information using the provisioning information and receive a verification result of the verification information from the service provider.

In an embodiment, the controller may be configured to transmit, through the communication circuit, a binding result between the digital user identifier and the subscriber information to the service provider and/or the UE.

The embodiments herein are provided merely for better understanding of the disclosure, and the disclosure should not be limited thereto or thereby. In other words, it is apparent to one of ordinary skill in the art that various changes may be made thereto without departing from the scope of the disclosure. Further, the embodiments may be practiced in combination.

Although the present disclosure has been described with various embodiments, various changes and modifications may be suggested to one skilled in the art. It is intended that the present disclosure encompass such changes and modifications as fall within the scope of the appended claims.

What is claimed:

1. A method performed by a network entity for mobile binding, the method comprising:

receiving, from a service provider, provisioning information for a user;

receiving, from a user equipment (UE), a binding request message including verification information and a digital user identifier related to a user equipment (UE) completing user authentication for the service provider;

verifying the verification information based on the provisioning information; and based on the verification information being successfully verified, binding the digital user identifier with subscriber information of the UE to be stored in a subscriber database, wherein the subscriber database is used to provide a service corresponding to a service invocation to the UE in response to receiving, from the service provider, the service invocation including the digital user identifier.

2. The method of claim 1, wherein the provisioning information includes at least one of:

a first indicator indicating a subscription request for digital user identifier binding;

a service provider identifier identifying the service provider;

an application function (AF) identifier;

a verification address indicating a server for identifying the digital user identifier;

security key information for identifying the digital user identifier;

a second indicator requesting a report of a binding result between the digital user identifier and the subscriber information; or a binding notification address indicating a server to which the binding result is to be reported.

3. The method of claim 1, wherein the binding request message includes at least one of a subscription identifier, the digital user identifier, a service identifier, a port identifier, the verification information, or a provisioning identifier indicating the provisioning information.

4. The method of claim 1, wherein verifying the verification information comprises:

requesting the service provider to verify the verification information based on the provisioning information; and receiving, from the service provider, a verification result of the verification information.

5. The method of claim 1, further comprising transmitting, to at least one of the service provider or the UE, a binding result between the digital user identifier and the subscriber information.

6. The method of claim 1, wherein the network entity includes an authentication server function (AUSF).

7. A network entity for mobile binding, the network entity comprising:

a communication circuit; and a controller operably connected to the communication circuit, the controller configured to:

receive, from a service provider, provisioning information for a user, receive a binding request message including verification information and a digital user identifier related to a user equipment (UE) completing user authentication for the service provider, verify the verification information based on the provisioning information, and based on the verification information being successfully verified, bind the digital user identifier with subscriber information of the UE to be stored in a subscriber database, wherein the subscriber database is used to provide a service corresponding to a service invocation to the UE in response to receiving, from the service provider, the service invocation including the digital user identifier.

8. The network entity of claim 7, wherein the provisioning information includes at least one of:

a first indicator indicating a subscription request for digital user identifier binding;

a service provider identifier identifying the service provider an application function (AF) identifier;

a verification address indicating a server for identifying the digital user identifier;

security key information for identifying the digital user identifier;

a second indicator requesting a report of a binding result between the digital user identifier and the subscriber information of the UE; or a binding notification address indicating a server to which the binding result is to be reported.

9. The network entity of claim 7, wherein the controller is further configured to receive, from the UE via the communication circuit, a request message including at least one of a subscription identifier, the digital user identifier, a service identifier, a port identifier, the verification information, or a provisioning identifier indicating the provisioning information.

10. The network entity of claim 7, wherein the controller is further configured to:

request the service provider to verify the verification information based on the provisioning information; and receive a verification result of the verification information from the service provider.

11. The network entity of claim 7, wherein the controller is further configured to transmit, to at least one of the service provider or the UE, via the communication circuit, a binding result between the digital user identifier and the subscriber information of the UE.

12. The network entity of claim 7, wherein the network entity includes an authentication server function (AUSF).

13. A method performed by a UE for mobile binding, the method comprising:

performing a digital user authentication operation with a service provider;

receiving, from the service provider, provisioning information for a user;

transmitting, to a network entity, a binding request message including a digital user identifier related to the UE completing user authentication for the service provider and verification information, wherein the verification information is verified based on the provisioning information; and receiving, from the network entity, a binding response message including a result of verifying the verification information, wherein the digital user identifier is bound with subscriber information of the UE to be stored in a subscriber database, and wherein the subscriber database is used to provide a service corresponding to a service invocation to the UE in response to receiving, from the service provider, the service invocation including the digital user identifier.

14. The method of claim 13, wherein the provisioning information includes at least one of:

a first indicator indicating a subscription request for digital user identifier binding;

a service provider identifier identifying the service provider;

an application function (AF) identifier;

a verification address indicating a server for identifying the digital user identifier, security key information for identifying the digital user identifier;

a second indicator requesting a report of a binding result between the digital user identifier and subscriber information; or a binding notice address indicating a server to which the binding result is to be reported.

15. The method of claim 13, wherein the binding request message includes at least one of a subscription identifier, the digital user identifier, a service identifier, a port identifier, the verification information, or a provisioning identifier indicating the provisioning information.

16. The method of claim 13, wherein the network entity includes an authentication server function (AUSF).

17. A user equipment (UE) for mobile binding, the UE comprising:

a communication circuit; and a controller operably coupled to the communication circuit, the controller configured to:

perform digital user authentication operation with a service provider, receive, from the service provider, provisioning information for a user, transmit, to a network entity, a binding request message including a digital user identifier related to the UE completing user authentication for the service provider and verification information, wherein the verification information is verified based on the provisioning information, and receive, from the network entity, a binding response message including a result of verifying the verification information, wherein the digital user identifier is bound with subscriber information of the UE to be stored in a subscriber database that is used to provide a service corresponding to a service invocation to the UE in response to receiving, from the service provider, the service invocation including the digital user identifier.

18. The UE of claim 17, wherein the provisioning information includes at least one of:

a first indicator indicating a subscription request for digital user identifier binding;

a service provider identifier identifying the service provider;

an application function (AF) identifier;

a verification address indicating a server for identifying the digital user identifier;

security key information for identifying the digital user identifier;

a second indicator requesting a report of a binding result between the digital user identifier and subscriber information; or a binding notification address indicating a server to which the binding result is to be reported.

19. The UE of claim 17, wherein the binding request message includes at least one of a subscription identifier, the digital user identifier, a service identifier, a port identifier, the verification information, or a provisioning identifier indicating the provisioning information.

20. The UE of claim 17, wherein the network entity includes an authentication server function (AUSF).

* * * * *